Patented Nov. 2, 1948

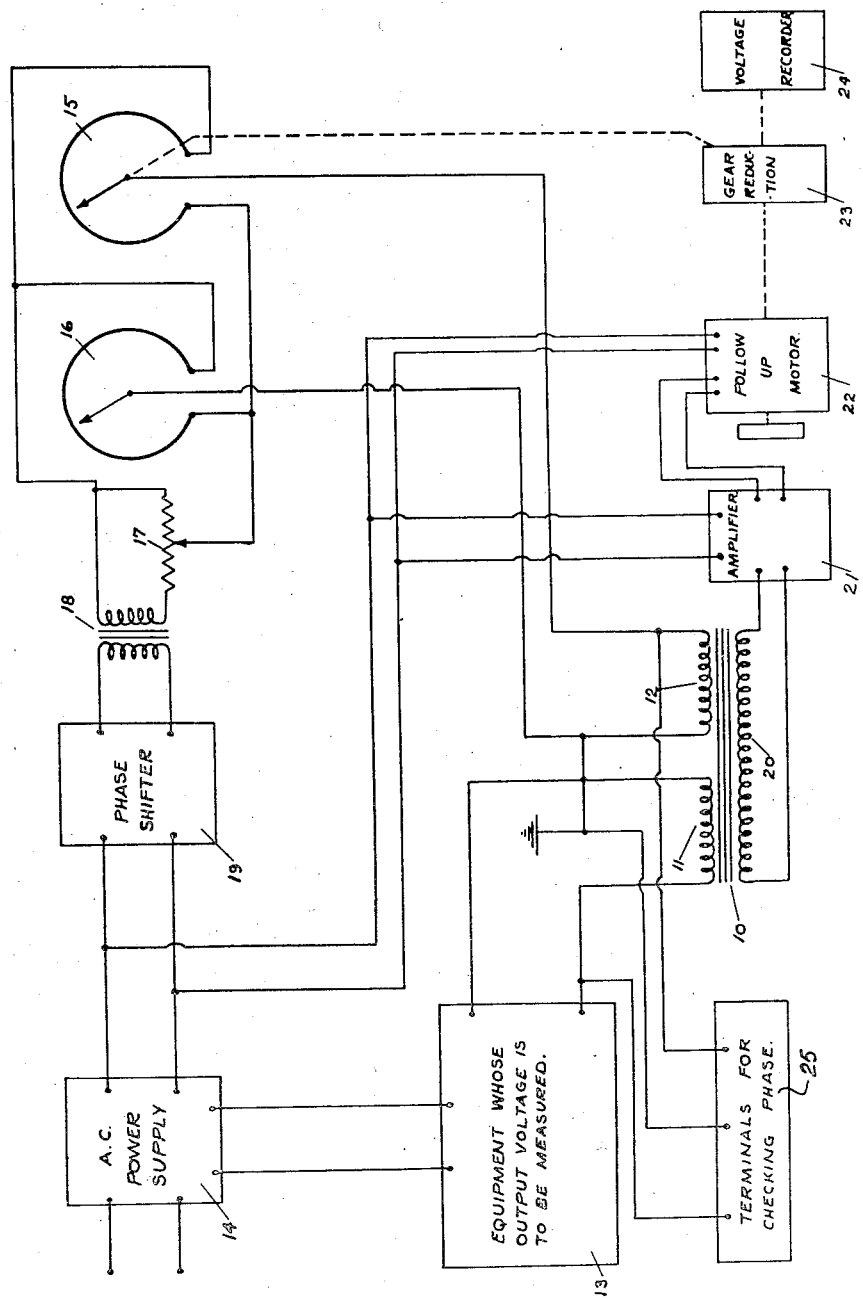

2,452,539

UNITED STATES PATENT OFFICE 2,452,539

SELF-BALANCING POTENTIOMETER

Bernard J. Baecher, New York, N. Y.

Application August 18, 1945, Serial No. 611,429

10 Claims. (Cl. 171—95)

(Granted under the act of March 3, 1883, as amended April 30, 1928; 370 O. G. 757)

This invention relates to a device for measuring and continuously recording A. C. voltages with a high degree of accuracy, even at low voltages, over a period of time.

An object of the invention is to measure and record A. C. voltages.

Another object is to provide an automatic A. C. self-balancing potentiometer.

Another object is to provide a voltage measuring device by which a voltage value can automatically be added or subtracted to or from the value of the voltage being measured.

Another object is to provide a continuous recording device.

Further objects and advantages of this invention, as well as its construction, arrangement and operation, will be apparent from the following description and claims in connection with the accompanying drawing, which is a schematic diagram of one embodiment of the invention.

In accomplishing the foregoing objects the invention consists in an apparatus that measures an applied unknown voltage by varying the magnitude of a reference or bucking voltage until the sum of the applied voltage and the bucking voltage is zero. This is done automatically by feeding the differential voltage between the applied and bucking voltages to an amplifier, of which the output drives a follow-up motor which, in turn, varies the bucking voltage until the latter is equal in magnitude to the applied voltage.

The two voltages are brought in opposition with each other in transformer 10, the applied voltage or voltage to be measured in primary winding 11 and the bucking voltage in primary winding 12. These two windings 11—12 are wound in opposition to each other or they may be additive if the two voltages are brought together 180° out of phase with each other.

The applied voltage is supplied to winding 11 from the equipment 13 whose output voltage is to be measured. This equipment 13 can generate its own voltage or can have a power input supply coming from any alternating current power source or supplied from power source 14 as shown.

The bucking voltage is supplied to winding 12 from two potentiometers or rheostats 15 and 16. Rheostat 15 is varied to change the magnitudes of the bucking voltage while rheostat 16 is used as a zero adjustment. Rheostats 15—16 are supplied from potentiometer 17. Potentiometer 17 is supplied by transformer 18 through a phase shifting device 19 which in turn is connected to the A. C. power supply 14.

In order that the bucking voltage shall be of the same frequency as the voltage to be measured, the power supply to the phase shifter 19 must have the same frequency as the voltage to be measured. It is also necessary that the two voltages be either in phase or 180° out of phase. This can normally be taken care of by the equipment itself, using phase shifter 19.

The range and sensitivity of the measurement depends upon the potential across rheostat 15. This can be readily adjusted by the use of potentiometer 17. The smaller the voltage placed across rheostat 15, the more sensitive the equipment becomes.

Once the two voltages are brought in opposition with each other the differential voltage is picked up by the secondary coil 20 of transformer 10. This differential voltage is carried to electronic amplifier 21 and amplified for the operation of follow-up motor 22. The follow-up motor drives rheostat 15 through a gear reduction box 23 in such manner as to eliminate the differential between the applied voltage and the bucking voltage. At the same time the follow-up motor 22 drives voltage recorder 24, which consists of a pen and paper arrangement, thereby giving a continuous record of the applied voltage.

The amplifier 21 and follow-up motor 22 can be supplied from any appropriate electrical power source or as shown from A. C. power supply 14. In addition the equipment is supplied with terminals 25 for convenience in checking the phase relationship of the applied and bucking voltages.

In operation, the desired range of sensitivity of the voltage to be measured is chosen and adjusted on potentiometer 17 to fit the chart as required for voltage recorder 24. The pen of the voltage recorder 24 is brought to zero by means of rheostat 16. Once the voltage to be measured is applied the bucking voltage is immediately brought to an equal magnitude and said magnitude recorded on voltage recorder 24.

It is possible, if desired, to add or subtract a function to the quantity being measured and thereby permit alteration of the record during operation. This is readily accomplished by having a cam or other device to move the zero adjustment the desired amount. This can be geared directly to equipment 13, the output voltage of which is to be measured if that equipment has mechanical motion, otherwise an independent driving mechanism would have to be used.

Various modifications and changes can be made in the above device without departing from the spirit and scope of the invention as set forth in the appended claims.

The invention described herein may be manufactured and used by or for the Government of the United States of America for governmental purposes without the payment of any royalties thereon or therefor.

What is claimed is:

1. An apparatus for measuring voltage comprising a source of electric energy including automatically adjustable means for providing a voltage having variable phase and amplitude characteristics, transformer means for opposing the voltage to be measured with a voltage from said source and for deriving a differential voltage therefrom, an electronic amplifier having for its input the differential voltage from said transformer means, a follow-up driving device operated by the amplified differential voltage, means for actuating said adjustable means to vary the phase and amplitude of the voltage from said source and responsive to said follow-up device, and voltage recording means also responsive to said follow-up device.

2. An apparatus for measuring A. C. voltage comprising means for generating a bucking voltage of the same frequency as the voltage to be measured, self-adjusting phase-reversing means for applying said bucking voltage in opposition to the voltage to be measured and for deriving a voltage corresponding to the difference of said bucking voltage and said voltage to be measured, electronic means to amplify the difference voltage, follow-up driving means responsive to the amplified difference voltage to operate the phase-reversing means substantially to eliminate the difference between said voltages.

3. Apparatus as defined in claim 2 wherein said self-adjusting phase-reversing means comprises a source of electric energy, a pair of resistance elements connected in parallel to said source, and independently movable contact means on each of said elements.

4. Apparatus as defined in claim 2 wherein said self-adjusting phase-reversing means comprises first and second potentiometer means, means connecting said potentiometer means in parallel, independently movable contacts on each said potentiometer means, and a conductive connection between said contact means.

5. Apparatus as defined in claim 2 wherein said self-adjusting phase-reversing means comprises a transformer having a multiple-winding primary, a source of electric energy, a pair of resistance elements connected in parallel to each other and to said source, a movable contact on each said resistance element, means connecting each said contact to a respective terminal of one of said primary windings, and means for applying the voltage to be measured across the terminals of another of said primary windings.

6. Apparatus as defined in claim 2 wherein said self-adjusting phase-reversing means comprises first and second potentiometer means connected in parallel relationship, and movable contacts on each said potentiometer means, and said apparatus further comprises means coupling said follow-up driving means to one of said movable contacts, the other of the movable contacts being independently adjustable to provide a variable magnitude zero-setting voltage.

7. Apparatus for measuring the magnitude of a voltage, comprising a transformer having plural primary windings and a secondary winding, means applying the voltage to be measured to one of said plural windings, means applying an adjustable reference voltage to another of said windings in phase opposition with said voltage to be measured, whereby a net voltage of magnitude corresponding to the difference between said voltage to be measured and said reference voltage is derived at the terminals of said secondary winding, and means responsive to said net voltage for adjusting said reference voltage to a value minimizing said net voltage.

8. The apparatus claimed in claim 7 wherein said reference-voltage applying means comprises a source of reference voltage, first and second potentiometer means interconnected in parallel and across said source, said first and second potentiometers having independently movable contact elements for adjusting the phase of the reference voltage.

9. Electrical apparatus comprising a transformer having a pair of primary windings and a secondary winding, first and second sources of electric energy, means coupling said first source to develop a first voltage across one of said primary windings, means coupling said second source to develop a second voltage across the other of said windings in phase opposition with said first voltage, whereby a net voltage difference between said first and second voltages is derived at the terminals of said secondary winding, means responsive to said net voltage difference for adjusting said second voltage to a value minimizing said net voltage difference, and means connected to said secondary winding for indicating the magnitude of the net-voltage-difference minimizing voltage.

10. The apparatus as in claim 9 wherein one of said source-coupling means comprises adjustable potentiometer apparatus having automatically operable means for controlling the phase of the voltage coupled thereby relative to the voltage coupled by the other of said source-coupling means.

BERNARD J. BAECHER.

REFERENCES CITED

The following references are of record in the file of this patent:

UNITED STATES PATENTS

| Number | Name | Date |
|---|---|---|
| 1,397,228 | Nyquist | Nov. 15, 1921 |
| 2,150,006 | Parker et al. | Mar. 7, 1939 |
| 2,270,991 | Bagno | Jan. 27, 1942 |
| 2,293,502 | Hermann | Aug. 18, 1942 |
| 2,348,177 | Keeler | May 2, 1944 |